(12) United States Patent
Perse

(10) Patent No.: US 6,398,393 B1
(45) Date of Patent: Jun. 4, 2002

(54) ILLUMINATED FOLDING FOOT PEG

(76) Inventor: Joey Lynn Perse, 69 Chickadee La., Bailey, CO (US) 80421

( * ) Notice: Subject to any disclaimer, the term of this patent is extended or adjusted under 35 U.S.C. 154(b) by 0 days.

(21) Appl. No.: 09/616,609

(22) Filed: Jul. 14, 2000

(51) Int. Cl.[7] .................................................. B62J 6/00
(52) U.S. Cl. ........................ 362/473; 362/390; 362/545
(58) Field of Search ................................. 362/234, 364, 362/369, 390, 287, 427, 473, 474, 475, 476, 800, 545; 340/432; 280/291; 74/594.4, 594.6

(56) References Cited

U.S. PATENT DOCUMENTS

| | | | | |
|---|---|---|---|---|
| 3,222,512 A | * | 12/1965 | Dickson | 362/390 |
| 4,797,791 A | * | 1/1989 | Burchick | 362/473 |
| 5,702,172 A | * | 12/1997 | Kilburn | 362/800 |

* cited by examiner

*Primary Examiner*—Y. My Quach-Lee
(74) *Attorney, Agent, or Firm*—Eric R. Katz

(57) ABSTRACT

An illuminated, folding, foot peg having electronic circuitry for controlling the illumination of the foot peg and an electrical connection arrangement adapted to prevent fraying of the electrical connection during repeated folding of the foot peg. The foot peg having a top for placement of a foot, a bottom and front and rear sides; a foot peg mount for pivotally mounting the foot pet to the vehicle so that the foot peg is foldable from an operational position to a folded position; an illumination device located on at least one of the front and rear sides of the foot peg; vibration damping material supporting the illumination device at the foot peg; and electrical wiring for connecting the illumination device to an electrical system of the vehicle, the electrical wiring having an insulating coating. Sheathing surrounds the electrical wiring at least at the foot peg mount, for preventing fraying of the coating on the wiring to protect against short circuiting of the wiring.

19 Claims, 4 Drawing Sheets

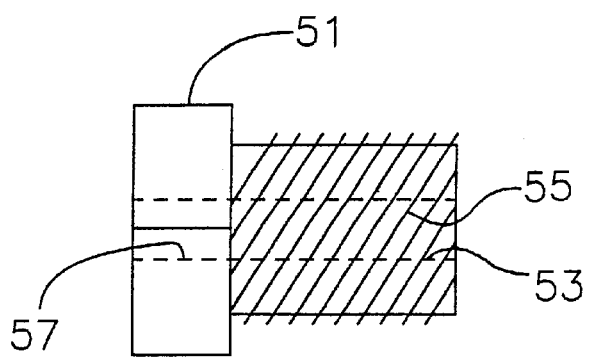
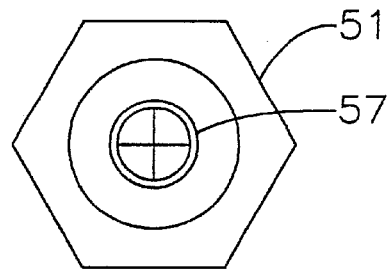
Fig. 4A          Fig. 4B
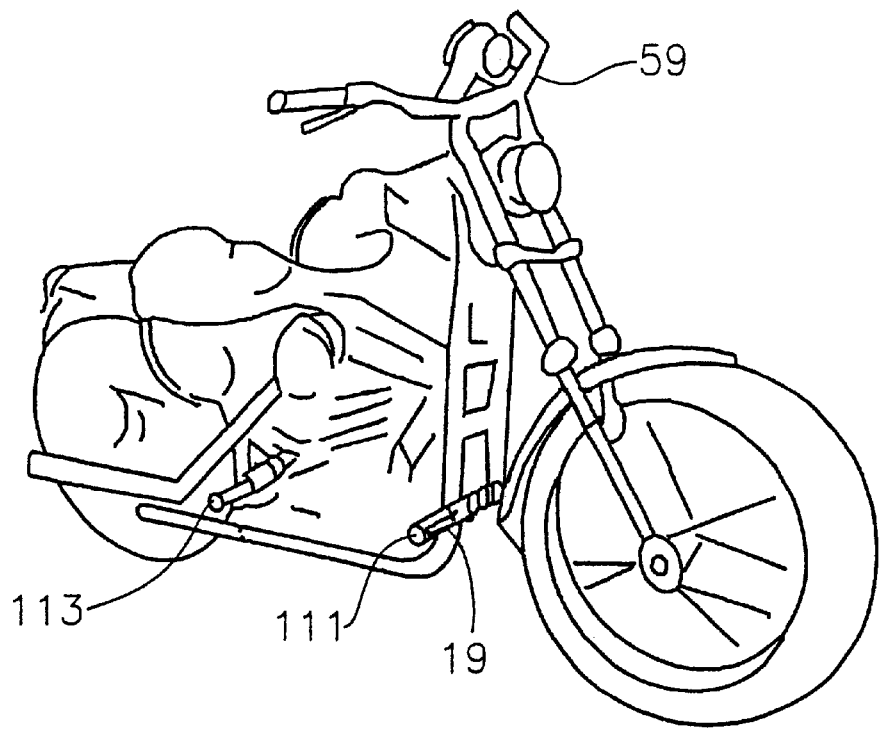
Fig. 5

ILLUMINATED FOLDING FOOT PEG

BACKGROUND OF THE INVENTION

1. Field of the Invention

The present invention generally relates to an illuminated foot peg for motorcycles, motorbikes and other motor vehicles utilizing a foot peg, and more particularly, to a folding, illuminated foot peg having electronic circuitry for controlling the illumination of the foot peg in a desired manner and an electrical connection arrangement particular adapted to prevent fraying of the electrical connection during repeated folding of the foot peg.

2. Background Discussion

U.S. Pat. No. 4,797,791 to Burchick discloses a safety device for motorcycles comprising a folding foot peg having a light located at the extreme outer end of the foot peg. The light serves as a safety device by delimiting the width of the motorcycle for approaching vehicles when the foot peg is swung out to the use position. The foot peg of Burchick is longer than the conventional foot peg and hinged to a bracket to facilitate folding thereof.

One particular problem with the arrangement of Burchick is that the electrical wiring connecting the light to the electrical power source of the motorcycle becomes frayed over time due to the repeated bending of the wiring at the hinge joint between the foot peg and the bracket. As a result, the electrical system may short circuit due to failure of the wiring insulation causing the motorcycle to become disabled.

Another drawback of the Burchick foot peg is that no provision is made to protect the lamp from damage or decreased operation life due to operational hazards such as stones and the like thrown up by other vehicles or the extreme vibrations experienced during the normal operation of a motorcycle. In addition, during tight cornering when the motorcycle is laid over as the rider leans into the turn, the extended length of the Burchick foot peg can result in the peg contacting the ground, resulting lose of control and/or damage to the light fixture since the light fixture is positioned in an exposed, outer location.

U.S. Pat. No. 5,997,023 to Sauter discloses a retractable foot peg that in one embodiment includes a light at the very outer end thereof. The lighted foot peg of Sauter suffers from the same drawbacks as the Burchick foot peg with regard to damage to the light from vibration, road hazards, arid/or contact with the road during operation of the motorcycle. Furthermore, Sauter fails to address potential problems from fraying or cracking of the insulation surrounding the electrical wiring during repeated retraction and extension of the foot peg.

In addition to the above-noted deficiencies of the prior art, none of the inventions discussed above disclose or suggest locating electronic circuitry in the foot peg to control the operation of the light in response to inputs received during braking, emergency flashers and the like.

SUMMARY OF THE INVENTION

Accordingly, it is an object of the present invention to provide an illuminated foot peg that overcomes the deficiencies of the prior art.

Another object of the present invention is to provide an illuminated foot peg that is foldable and specially adapted so that the electrical wiring connecting the illuminating device to the electrical system of the motorcycle does not fray or short circuit after repeated folding of the foot peg.

It is a further object of the present invention to provide an illuminated foot peg that is protected against vibration and damage resulting from the operation of a motorcycle.

It is yet another object of the present invention to provide an illuminated foot peg having electronic circuitry located at the foot peg for controlling the operation of the illumination device.

Advantageous features of the illuminated folding foot peg of the present invention include: 1) the ability to control the operation of the illumination device of the foot peg to permit, for example, sequential operation of a series of illumination devices such as, for example, LED's and the like, which can be recessed into the foot peg, 2) the elimination of the need for repeated replacement of the electrical wiring connecting the illuminate device to the electrical system of the vehicle, 3) the ability to operate the illumination device without risk of damage during normal operation of the motorcycle, road hazards, tight cornering and the like, 4) the ability to provide an illuminated foot peg that is protected against high impact forces and vibration, and 5) the ability to control the operation of the illuminated foot peg using a computer by locating an electronic circuit board in the foot peg.

BRIEF DESCRIPTION OF THE DRAWINGS

FIGS. 3A–3E are top, sectional, side and end views respectively of one embodiment of the mount for pivotally attaching the foldable foot peg to a vehicle;

FIG. 4A–4B are side and end views respectively of the mounting bolt of the present invention; and FIG. 5 illustrates the illuminated, foldable, foot peg of the present invention applied to a vehicle.

DETAILED DESCRIPTION OF THE PREFERRED EMBODIMENT(S)

Figure 1:
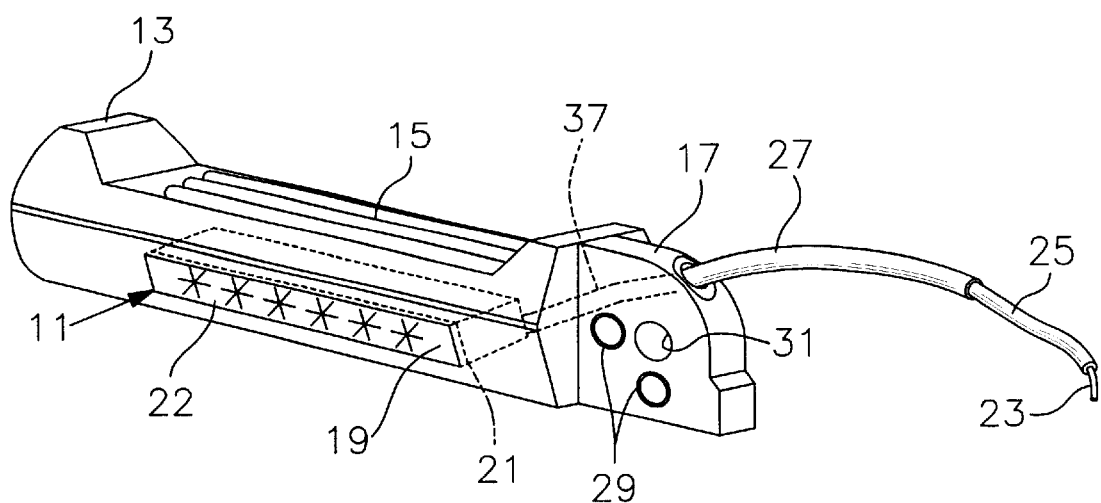
FIG. 1 a perspective view of one embodiment of the illuminated, folding foot peg illustrated in accordance with the teachings of the present invention.
Figure 2A:
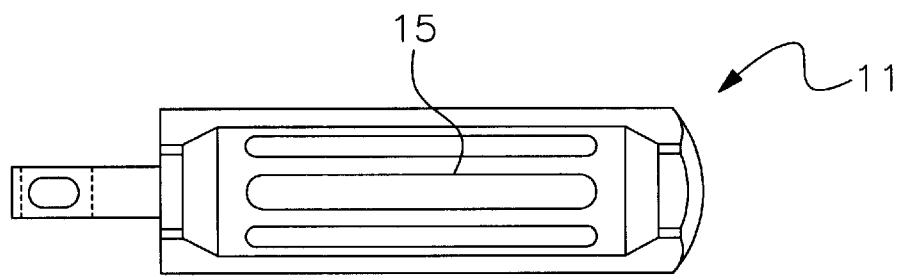
FIGS. 2A–2E are top, side, sectional, bottom and end views respectively of the foot peg of FIG. 1.
Figure 2B:
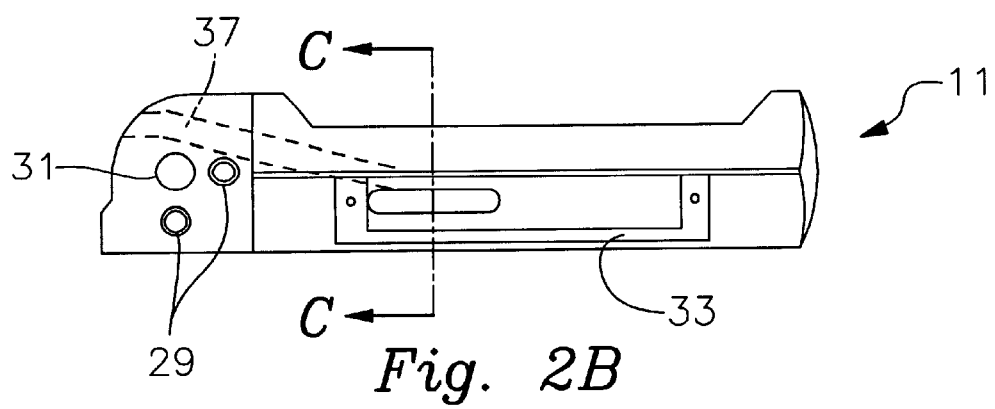
Figure 2C:
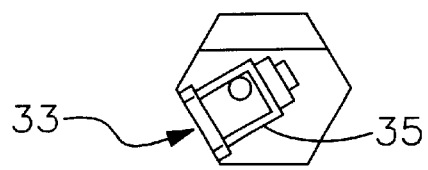
Figure 2D:
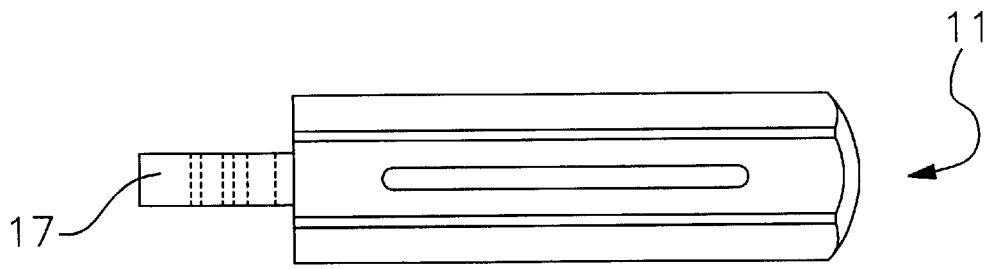
Figure 2E:
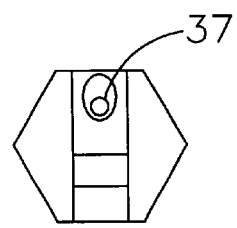

FIG. 1 a perspective view of one embodiment of the illuminated, folding foot peg, generally indicated at 11, in accordance with the teachings of the present invention. The foot peg 11 has a hexagonal cross-section and comprises a top 13 which includes a foot pad 15, a flange 17 at one end for pivotally mounting the foot peg 11 to a mount (not shown) and an illumination device 19 located on at least one of the front and rear sides of the foot peg 11. In the embodiment illustrated by FIG. 1, the illumination device 19 comprises, for example, a light emitting diode (LED) strip, the operation of which is controlled by inputs to electronic circuitry 21 (shown in ghost lines) located in the foot peg 11. The illumination device is, for example, recessed into the foot peg 11 and covered, for example, by a clear, impact resistance material 22, made, for example, of plexiglass or the like.

Electrical wiring 23 connects the illumination device 19 to an electrical system of a vehicle (not shown), the electrical wiring 23 having an insulating coating 25. Sheathing 27 surrounds the electrical wiring 23 at least in the area where the foot peg 11 is pivotally attached to the foot peg mount (not shown) for preventing fraying of the insulating coating 25 on the electrical wiring 23 to protect against short circuiting of the wiring. According to one embodiment of the present invention, the sheathing 27 comprises, for example, a heat shrink wrap material and accordance with a further embodiment, the heat shrink wrap material is a heat shrink wrap tube. It should be noted that any suitable material may be used as sheathing 27 which is adapted to prevent cracking or fraying of the insulating coating 25 of the wiring 23 resulting from repeated-bending of the wiring 23 at the pivot point.

The flange 17 has a pair of ball detent 29 which cooperate with indentations on the mount (not shown) to maintain the foot peg 11 in the extended position or the folded position. In addition, the flange 17 has a hole 31 through which a hinge pin (not shown) is inserted to pivotally attach the foot peg 11 to the mount 41 shown in FIGS. 3A–3E.

Referring to FIGS. 2A–2E, the foot peg 11 has a cavity, generally indicated at 33 in which the illumination device 19 and associated electronic circuitry 21 are inserted. To prevent the detrimental effects of vibration experienced during the operation of the vehicle, vibration damping material 35 supports the illumination device 19 and associated electronic circuitry 21 in the cavity 33. The vibration damping material 35 comprises, for example, silicon rubber or the like, or any other suitable material vibration damping material. A bore 37, leading from the cavity 33 to the flange 17, is provided, though which the electrical wiring 23 extends. The bore 37 is drilled at an angle so that the electrical wiring 23 does not interfere with the pivoting of the foot peg 11, i.e., clearance between hole 31 and the bore 37 is provided during pivoting of the foot peg 11.

Referring to FIG. 3A, the foot peg mount 39 is illustrated for pivotally mounting the foot peg 11 to the vehicle (not shown) so that the foot peg 11 is foldable from an operational, extended position to a folded, stored position. The mount 39 has two spaced flanges 41 that form a slot 43 into which the flange 17 of the foot peg 11 is received and a bore 45 through which the sheathed wiring 23 extends. The interior of bore 45 is threaded which cooperate with threads 53 on the exterior of mounting bolt 51 (shown in FIGS. 4A–4B) to attach the mount 39 to the vehicle. Another bore 47 is provided through which a hinge pin (not shown) is inserted to pivotally connect the foot peg 11 to the mount 39 by way of hole 31 in flange 17 of the foot peg 11.

Figure 3E:
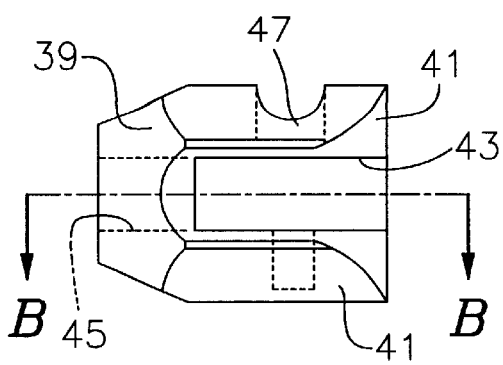
Figure 3E:
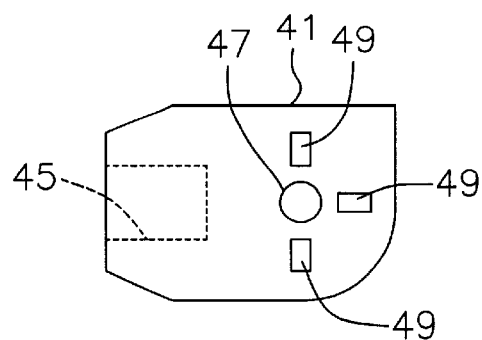
Figure 3E:
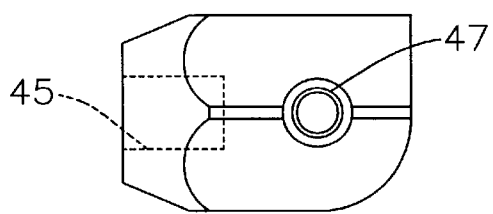
Figure 3E:
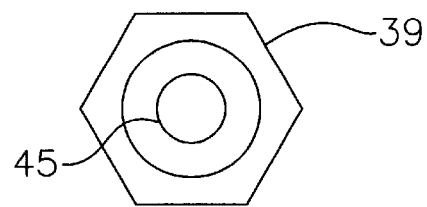
Figure 3E:
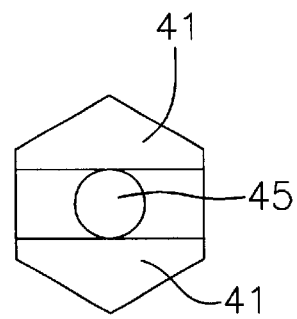

As best seen in FIG. 3B, on the interior surface of each of the flanges 41 are a series of indentations 49 adapted to receive the ball detents 29 on the flange 17 of the foot peg 11 to hold the foot peg 11 in either the extended, operational position or the folded, stored position. As best seen in FIGS. 3D and 3E, the mount 39 has, for example, a substantially hexagonal-shaped cross-section.

Referring to FIGS. 4A and 4B, the mounting bolt 51, having threads 53 on the exterior of the shaft 55, is used to attach the mount 39 to the vehicle. The mounting bolt has a substantially hexagonal cross-section and is provided with a bore 57 through which the wiring 23 extends. Referring to FIG. 5, a vehicle 59, for example, a motorcycle, is illustrated with the illuminated, folding, foot pegs 11 of the present invention. In the embodiment illustrated by FIG. 5, the front foot peg 111 has the illumination device 19 facing forward and the rear foot peg 113 has the illumination device (not shown) facing rearward. The operation of the illumination devices 19 of each of the foot pegs 111, 113 are controlled by the electronic circuit 21 located in the foot pegs in accordance with inputs received from the vehicle 59. The inputs from the vehicle 59 include, for example, one of application of brakes, operation of turn indicators, and operation of headlights as well operation of emergency flashers and operation of the tail light.

When the illumination device 19 comprises a series of lamps, such as LED's, the electronic circuitry 21 causes, for example, the light emitting diodes to illuminate sequentially in response to operation of a turn indicator. In addition, the electronic circuitry 21 can cause the illumination device 19 to flash in response to application of the brakes. Further the frequency of the flashing of the illumination device can be made dependent upon the intensity of the braking, i.e., the harder the braking, the faster the flashing of the illumination device 19.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. An illuminated, foldable, foot peg for a vehicle comprising:
   a foot peg having a top for placement of a foot, a bottom and front and rear sides;
   a foot peg mount for pivotally mounting the foot peg to the vehicle so that the foot peg is foldable from an operational position to a folded position;
   an illumination device located on at least one of the front and rear sides of the foot peg;
   vibration damping material supporting the illumination device at the foot peg;
   electrical wiring for connecting the illumination device to an electrical system of the vehicle, the electrical wiring having an insulating coating; and
   sheathing surrounding the electrical wiring at least at the foot peg mount for preventing fraying of the insulating coating on the electrical wiring to protect against short circuiting of the wiring.

2. An illuminated, foldable, foot peg according to claim 1, wherein the sheathing surrounding the electrical wiring is made of a heat shrink wrap material.

3. An illuminated, foldable, foot peg according to claim 2, wherein the heat shrink wrap material is a heat shrink wrap tube.

4. An illuminated, foldable, foot peg according to claim 1, wherein the vibration damping material comprises silicon.

5. An illuminated, foldable, foot peg according to claim 1, wherein the illumination device comprises a series of illumination means.

6. An illuminated, foldable, foot peg according to claim 1, wherein the illumination device is recessed into the foot peg.

7. An illuminated, foldable, foot peg according to claim 6, wherein the recessed illumination device is covered with a clear lens.

8. An illuminated, foldable, foot peg according to claim 7, wherein the clear lens is made of an impact resistant material.

9. An illuminated, foldable, foot peg according to claim 8, wherein the impact resistant material is plexiglass.

10. An illuminated, foldable, foot peg according to claim 1, wherein the illumination device is controlled by an electronic circuit located in the foot peg that controls the illumination device in accordance with inputs received from the vehicle.

11. An illuminated, foldable, foot peg according to claim 10, wherein the inputs from the vehicle include at least one of application of brakes, operation of turn indicators, operation of emergency flashers, and operation of headlights.

12. An illuminated, foldable, foot peg according to claim 1, wherein the illumination device is controlled by inputs from the vehicle including at least one of application of brakes, operation of a turn indicator, operation of emergency flashers and operation of head and tail lights.

13. An illuminated, foldable, foot peg according to claim 1, wherein the foot peg has a substantially hexagonal transverse cross-section.

14. An illuminated, foldable, foot peg according to claim 1, wherein the illumination device comprises a series of light emitting diodes.

15. An illuminated, foldable, foot peg according to claim 14, wherein the illumination of the series of light emitting diodes is controlled by an electronic circuitry located in the foot peg.

16. An illuminated, foldable, foot peg according to claim 15, wherein the electronic circuitry controls the illumination of the series of light emitting diodes in response to inputs from the vehicle.

17. An illuminated, foldable, foot peg according to claim 16, wherein the inputs from the vehicle include at least one of operation of brakes, operation of a turn indicator, operation of emergency flashers and operation of headlights.

18. An illuminated, foldable, foot peg according to claim 17, wherein the electronic circuitry causes the light emitting diodes to illuminate sequentially in response to operation of a turn indicator.

19. An illuminated, foldable, foot peg according to claim 18, wherein the electronic circuitry causes the light emitting diodes to flash in response to application of the brakes.

* * * * *